United States Patent
Kim

(10) Patent No.: US 9,123,489 B2
(45) Date of Patent: Sep. 1, 2015

(54) GAS INSULATED SWITCHGEAR

(75) Inventor: Hyung Choon Kim, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 188 days.

(21) Appl. No.: 14/117,648

(22) PCT Filed: Oct. 11, 2011

(86) PCT No.: PCT/KR2011/007509
§ 371 (c)(1),
(2), (4) Date: Nov. 14, 2013

(87) PCT Pub. No.: WO2012/157819
PCT Pub. Date: Nov. 22, 2012

(65) Prior Publication Data
US 2014/0078648 A1 Mar. 20, 2014

(30) Foreign Application Priority Data
May 16, 2011 (KR) .................. 10-2011-0045599

(51) Int. Cl.
*H01H 33/64* (2006.01)
*H02B 1/20* (2006.01)
(Continued)

(52) U.S. Cl.
CPC ............ *H01H 33/64* (2013.01); *H01H 3/264* (2013.01); *H01H 33/36* (2013.01); *H01H 33/42* (2013.01); *H01H 33/70* (2013.01); *H02B 1/20* (2013.01); *H02B 7/01* (2013.01)

(58) Field of Classification Search
CPC ....... H01H 33/64; H01H 33/42; H01H 33/70; H01H 3/264; H01H 3/40; H01H 31/02; H01H 33/34; H01H 33/36; H02B 7/01; H02B 1/20

USPC .................. 361/600–605, 612, 618, 619, 621; 200/48 R, 253.1, 81 R, 526–528, 500, 200/507; 218/7, 14, 26, 84, 44, 120, 78, 79, 218/80, 154, 156; 174/14 R, 21 C, 17 R, 174/17 GE, 17.08, 28, 29, 68, 79, 99 B, 520
See application file for complete search history.

(56) References Cited

U.S. PATENT DOCUMENTS 3,801,768 A * 4/1974 Meyer ..................... 200/253.1
4,007,346 A * 2/1977 Gaigg ......................... 218/44
(Continued)

FOREIGN PATENT DOCUMENTS

JP    2000-299040 A    10/2000
KR    20-0291485 Y1    10/2002
(Continued)

OTHER PUBLICATIONS

International Search Report for PCT/KR2011/007509 mailed May 24, 2012 from Korean Intellectual Property Office.

*Primary Examiner* — Michail V Datskovskiy
(74) *Attorney, Agent, or Firm* — Sherr & Jiang, PLLC

(57) ABSTRACT

A gas insulated switchgear includes a support frame, a first fixed conductor being installed on one side of the support frame, a second fixed conductor opposing the first fixed conductor and being installed on another side of the support frame, a screw forming an axis on inner of the support frame and being spaced apart from the first and second fixed conductor, a first movable contact wherein one side of the first movable contact is bent and another side of the first movable contact moves along the axis through a rotation of the screw and a second movable contact wherein one side of the second movable contact is bent and another side of the second movable contact is move along the axis through a rotation of the screw.

11 Claims, 2 Drawing Sheets

(51) Int. Cl.
   *H01H 33/70* (2006.01)
   *H01H 3/26* (2006.01)
   *H01H 33/36* (2006.01)
   *H01H 33/42* (2006.01)
   *H02B 7/01* (2006.01)

(56) References Cited

U.S. PATENT DOCUMENTS

| | | | | |
|---|---|---|---|---|
| 5,625,179 | A * | 4/1997 | Bleiker et al. | 218/80 |
| 5,828,025 | A * | 10/1998 | Neumaier et al. | 218/79 |
| 6,559,403 | B2 * | 5/2003 | Gutalj | 218/79 |
| 7,122,759 | B2 * | 10/2006 | Moser et al. | 218/79 |
| 7,186,942 | B1 * | 3/2007 | Slade et al. | 218/120 |
| 7,429,710 | B2 * | 9/2008 | Gutalj et al. | 218/79 |
| 7,432,465 | B2 * | 10/2008 | Pavlovic et al. | 218/79 |
| 7,943,881 | B2 * | 5/2011 | Gimeno et al. | 218/79 |
| 8,885,327 | B2 * | 11/2014 | Kawahigashi et al. | 361/618 |
| 2013/0008873 | A1 * | 1/2013 | Siegenthaler et al. | 218/146 |
| 2014/0353136 | A1 * | 12/2014 | Von Prondzinski et al. | 200/81 R |

FOREIGN PATENT DOCUMENTS

| | | |
|---|---|---|
| KR | 10-0370103 B1 | 1/2003 |
| KR | 10-0797982 B1 | 1/2008 |
| KR | 10-1026842 B1 | 4/2011 |

* cited by examiner

GAS INSULATED SWITCHGEAR

CROSS REFERENCE TO PRIOR APPLICATIONS

This application is a National Stage Patent Application of PCT International Patent Application No. PCT/KR2011/007509 filed on Oct. 11, 2011 under 35 U.S.C. §371, which claims priority under 35 U.S.C. §119 to Korean Patent Application No. 10-2011-0045599 filed on May 16, 2011, which are all hereby incorporated by reference in their entirety.

BACKGROUND OF THE INVENTION

1. Field of the Invention

The present invention relates to a gas insulated switchgear and more particularly, to a gas insulated switchgear using a perpendicular movement of two axes to implement a two phase switch.

2. Background of the Invention

In general, a Gas Insulated Switchgear (GIS) corresponds to a switch device shutting off a current when a fault current is generated. The GIS embeds a circuit breaker, a disconnecting switch, a ground switch, a current transformer and a busbar and so on in a grounded metal tank and charges an SF6 gas having a good characteristic of insulation and extinction. The GIS has advantages such as a substation minimization, a safety and reliability improvement, an operation and maintenance easiness, an environment suitability. The GIS is categorized into a two phase switch and a three phase switch and the two phase switch has been developed due to an easiness, a safeness and a small space.

SUMMARY OF THE INVENTION

In some embodiments, a gas insulated switchgear includes a support frame, a first fixed conductor being installed on one side of the support frame, a second fixed conductor opposing the first fixed conductor and being installed on another side of the support frame, a screw forming an axis on inner of the support frame and being spaced apart from the first and second fixed conductors, a first movable contact wherein one side of the first movable contact is bent and another side of the first movable contact may move along the axis through a rotation of the screw and a second movable contact wherein one side of the second movable contact is bent and another side of the second movable contact may move along the axis through a rotation of the screw.

The screw thread patterns in upper and lower parts of the screw may be opposite.

The bending side of the first and second movable contacts may be opposite with each other.

The gas insulated switchgear further include a first movable member being combined with the first movable contact and the screw, and a second movable member being combined with the second movable contact and the screw. In one embodiment, the first movable member may be screw-coupled to the lower part of the screw to move up and down along a direction of the axis according to a rotation of the screw and the second movable member may be screw-coupled to the upper part of the screw to move up and down along a direction of the axis according to a rotation of the screw.

The first and second movable contacts may move to an opposite direction with each other through a rotation of the screw. In one embodiment, the first fixed conductor may be electrically connected with the first movable contact regardless of a movement of the first movable contact and the second fixed conductor may be electrically connected with the second movable contact regardless of the movement of the second movable contact.

A contact region of the first and second contacts may be welded or combined with a component having a material resisting an arc.

DETAILED DESCRIPTION OF THE EMBODIMENTS

Figure 1:
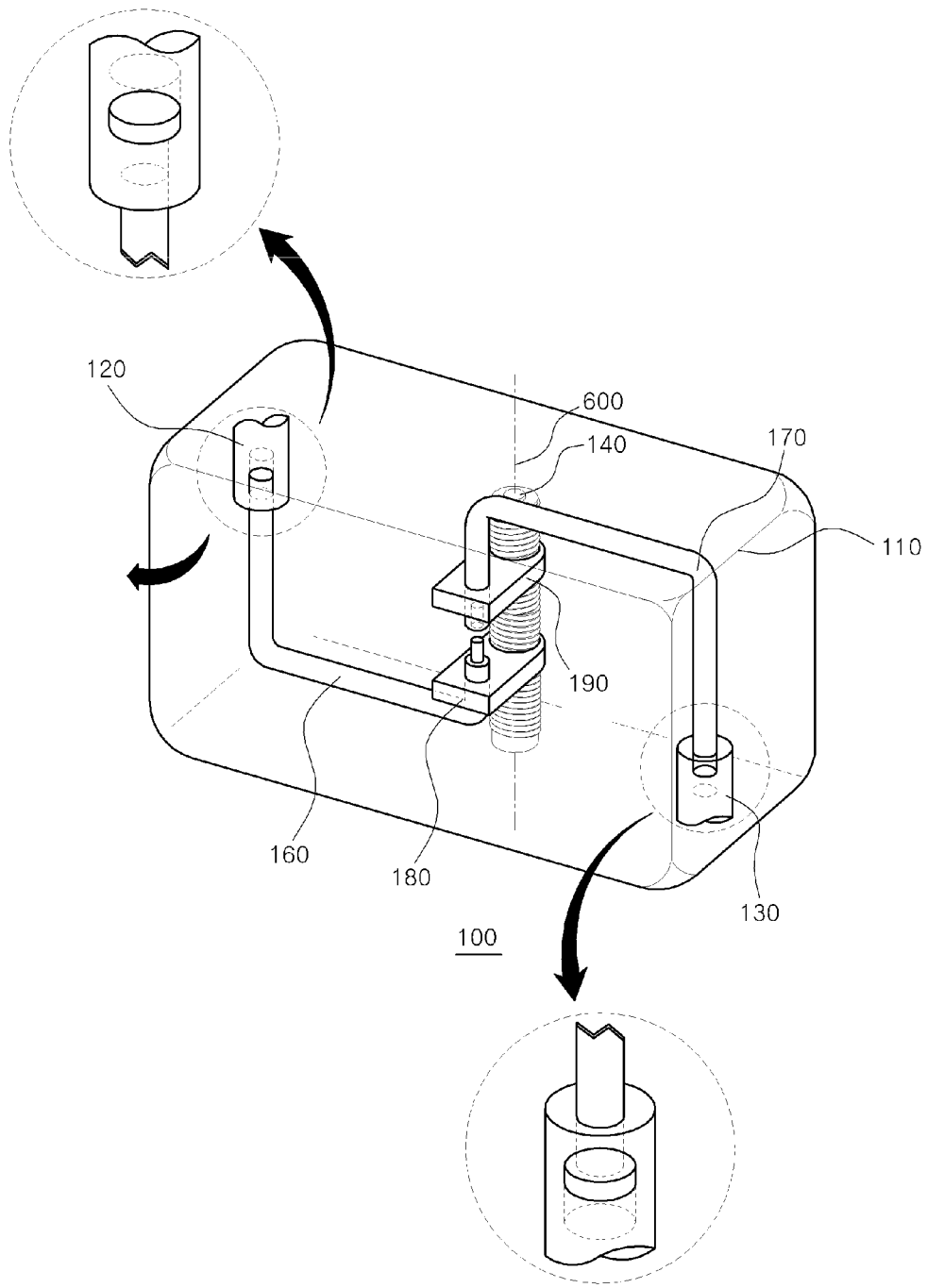
FIG. 1 is a perspective diagram illustrating a gas insulated switchgear according to an example embodiment of the present invention.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "~between", "immediately~between" or "adjacent to~" and "directly adjacent to~" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a perspective diagram illustrating a gas insulated switchgear according to an example embodiment of the present invention.

Referring to FIG. 1, a gas insulated switchgear 100 includes a support frame (e.g., enclosure) 110, first and second fixed conductors 120 and 130, a screw 140, first and second movable contacts 160 and 170, and first and second movable members 180 and 190.

The support frame 110 corresponds to a structure having the screw 140 and an insulating body. The insulating body includes the first and second fixed conductors 120 and 130 connectable with a main busbar, a busbar or a ground terminal.

The first fixed conductor 120 may be installed on one side inner the support frame 110 and may form a hall on one side to be electrically connected with the first movable contact 160 regardless of a movement of the first movable contact 160. In one embodiment, an opening (i.e., front part) of the hall in the first fixed conductor 120 is narrower than that inner of the hall. The first fixed conductor 120 may be connected with an outside line (i.e., a busbar, a main busbar or a ground terminal) thereby an electric current may be applied.

The second fixed conductor 130 may be installed on another side of the support frame 110 in an opposition with the first fixed conductor 120 and may form a hall on one side to be electrically connected with the second movable contact 170 regardless of a movement of the second movable contact 170. In one embodiment, an opening (i.e., front part) of the hall in the second fixed conductor 130 of the hall in the second fixed conductor 130 is narrower than that inner of the hall. The second fixed conductor 130 may be connected with an outside line (i.e., a busbar, a main busbar or a ground terminal) thereby an electric current may be applied.

The screw 140 may form an axis 600 inner of the support frame 110 and may be spaced apart from the first and second fixed conductors 120 and 130. In one embodiment, the screw 140 may pass through the first and second movable members 180 and 190 and may form an axis 600 being parallel to the first and second fixed conductors 120 and 130. The screw 140 may rotate on the axis 600 and both ends of the screw 140 may be fixed inner of the support frame 110.

In one embodiment, the screw 140 may be divided into upper and lower parts according to a longitudinal direction and screw thread patterns in upper and lower parts of the screw may be opposite.

The first movable contact 160 may correspond to a metal conductor and the metal conductor is combined with the first movable member 180 to move along the axis 600. In one embodiment, one side of the first movable contact 160 may be bent at a right angle and may form a "凸" shaped protrusion. Another side of the first movable contact 160 may be bent at a right angle and may be inserted into the hall of the first fixed conductor 120 to be flexibly and electrically connected with the first fixed conductor 120.

In one embodiment, another side of the first movable contact 160 may be connected with inner of the hall of the first fixed conductor 120 and may be more widened to a degree where another side of the first movable contact 160 is larger than an opening part of the hall to enlarge a contact area between the first movable contact 160 and the first conductor 120.

The second movable contact 170 may correspond to a metal conductor and the metal conductor is combined with the second movable member 190 to move along the axis 600. In one embodiment, one side of the second movable contact 170 may be bent at a right angle and may form a "凹" shaped hall to embed the protrusion of the first movable contact 160. In another embodiment, one side of the second movable contact 170 may combine a different connector. Another side of the second movable contact 170 may be bent at a right angle and may be inserted into the hall of the second fixed conductor 130 to be flexibly and electrically connected with the second fixed conductor 130.

In one embodiment, another side of the second movable contact 170 may be connected with inner of the hall of the second fixed conductor 130 and may be more widened to a degree where another side of the second movable contact 170 is larger than an opening part of the hall to enlarge a contact area between the second movable contact 170 and the second conductor 130.

In one embodiment, another side of the first movable contact 160 may be connected with inner of the hall of the first fixed conductor 120 and may be more widened to a degree where another side of the first movable contact 160 is larger than an opening part of the hall to enlarge a contact area between the first movable contact 160 and the first conductor 120.

In one embodiment, the bent sides of the first and second movable contacts 160 and 170 may be opposite with each other.

The first movable member 180 may correspond to a nonconductor being combined with the first movable contact 160 and a lower part of the screw 140. In one embodiment, the first movable member 180 may be screw-coupled to the lower part of the screw 140 to move up and down along a direction of the axis 600 according to a rotation of the screw 140.

The second movable member 190 may correspond to a nonconductor being combined with the second movable contact 170 and a upper part of the screw 140. In one embodiment, the second movable member 190 may be screw-coupled to the screw 140 to move up and down along a direction of the axis 600 according to a rotation of the screw 140.

In one embodiment, the first and second contacts 160 and 170 may move to an opposite direction with each other through a rotation of the screw 140. In other words, screw thread patterns in upper and lower parts of the screw are opposite. Therefore, the first movable member 180 may move up and the second movable member 190 may move down when the screw 140 rotates in one direction. Also, the first movable member 180 may move down and the second movable member 190 may move up when the screw 140 rotates in another direction.

In one embodiment, a contact region of the first and second movable contacts 160 and 170 may be welded or combined with a component having a material resisting an arc. An arc-resisting material may protect the first and second movable contacts 160 and 170 from an arc being caused by a high voltage current when the first and second contacts 160 and 170 are spaced apart with each other.

In FIG. 1, the gas insulated switchgear 100 is open in case where the first and second movable contacts 160 and 170 are spaced apart from each other.

Figure 2:
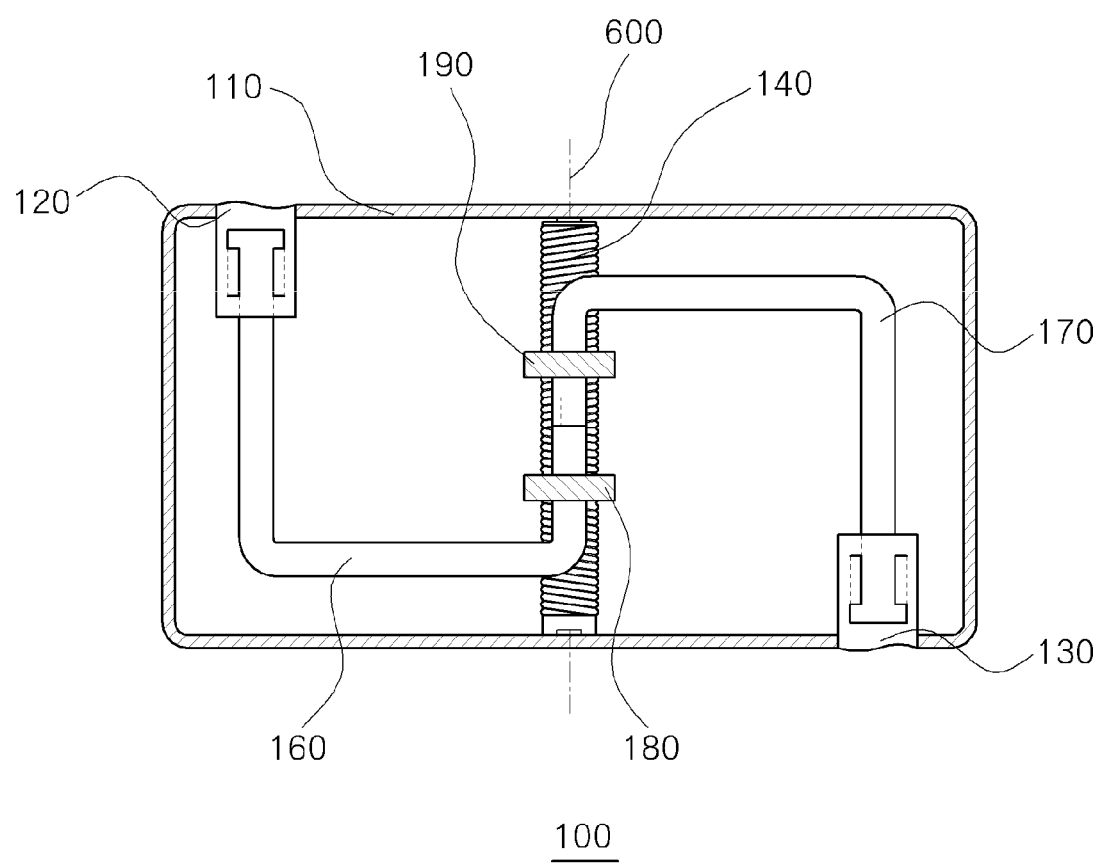
FIG. 2 is a cross sectional diagram illustrating a gas insulated switchgear in FIG. 1 where the gas insulated switchgear is closed.

FIG. 2 is a cross sectional diagram illustrating a gas insulated switchgear in FIG. 1 where the gas insulated switchgear is closed.

In FIG. 2, when the screw 140 rotates in one direction, the first movable member 180 being combined with a lower part of the screw 140 may move up due to a turning force to lift the first movable contact 160 being combined with the first movable member 180. Also, the second movable member 190 being combined with a upper part of the screw 140 may move down due to a turning force to lift the second movable contact 170 being combined with the second movable member 190. As a result, the first and second movable contacts 160 and 170 may be in contact to be electrically connected with each other.

In one embodiment, a system is in a steady state when the first fixed conductor 120 is connected with the busbar and the second fixed conductor 130 is connected with the main busbar. The system is in a ground state when the first fixed conductor 120 is connected with the ground terminal and the second fixed conductor 130 is connected with the main busbar.

The disclosed technique may have the following effects. That is, unless otherwise specified, but rather should be construed broadly within its scope as defined in the appended claims. Therefore, various changes and modifications that fall within the scope of the claims, or equivalents of such scope are therefore intended to be embraced by the appended claims.

The gas insulated switchgear according to one embodiment may be operated based on an axial movement and may cause inner of the gas insulated switchgear to be simply configured thereby the gas insulated switchgear may effectively implement the two phase state.

The gas insulated switchgear according to one embodiment requires a shorter movement section when two movable contacts are used rather than when one movable contact is used. Therefore, an overall size of the gas insulated switchgear may be minimized in comparison with that of a conventional gas insulated switchgear.

The gas insulated switchgear according to one embodiment may use two conductors having a slope and a slope side of the two conductors may have a pushing force to stably connect two lines.

Although this document provides descriptions of preferred embodiments of the present invention, it would be understood by those skilled in the art that the present invention can be modified or changed in various ways without departing from the technical principles and scope defined by the appended claims.

Description of symbols
100: GAS INSULATED SWITCHGEAR
110: SUPPORT FRAME
120: FIRST FIXED CONDUCTOR
130: SECOND FIXED CONDUCTOR
140: SCREW
160: FIRST MOVABLE CONTACT
170: SECOND MOVABLE CONTACT
180: FIRST MOVABLE MEMBER
190: SECOND MOVABLE MEMBER

What is claimed is:

1. A gas insulated switchgear comprising:
    a support frame which forms a housing of the gas insulated switchgear;
    a first fixed conductor being installed in a first side of the support frame;
    a second fixed conductor being installed in a second side of the support frame which is opposite to the first side;
    a screw forming an axis in an inner space of the support frame and being spaced apart from the first and second fixed conductors;
    a first movable contact having a first end being in contact with the first fixed conductor, the first movable contact movable along the axis when the screw rotates;
    a second movable contact having a first end being in contact with the second fixed conductor, wherein the second movable contact moves along the axis when the screw rotates so that the second movable contact is connected with or disconnected from the first movable contact.

2. The gas insulated switchgear of claim 1, wherein the screw has an upper part having a first thread pattern associated with the second movable contact and a lower part having a second thread pattern opposite to the first thread pattern and associated with the first movable contact so that the first and second movable contacts move in opposite directions when the screw rotates.

3. The gas insulated switchgear of claim 1, wherein the first movable contact includes a second end bent upward and the second movable contact includes a second end bent downward, the second end of the second movable contact facing and being contactable with the second end of the first movable contact.

4. The gas insulated switchgear of claim 1, further comprising:
    a first movable member movably engaged with the screw and fixed to the first movable contact; and
    a second movable member movably engaged with the screw and fixed to the second movable contact.

5. The gas insulated switchgear of claim 4, wherein the first movable member is screw-coupled to a lower part of the screw to move up and down along an axial direction of the screw according to a rotation of the screw, and
    wherein the second movable member is screw-coupled to an upper part of the screw to move up and down along the axial direction of the screw according to the rotation of the screw.

6. The gas insulated switchgear of claim 1, wherein the first and second movable contacts move to opposite directions with each other when the screw rotates.

7. The gas insulated switchgear of claim 1, wherein the first fixed conductor is electrically connected with the first movable contact regardless of a movement of the first movable contact, and
    wherein the second fixed conductor is electrically connected with the second movable contact regardless of a movement of the second movable contact.

8. The gas insulated switchgear of claim 1, wherein a contact region of the first and second contacts is welded or combined with a component having a material resisting an arc.

9. The gas insulated switchgear of claim 1, wherein one of the first and second movable contacts includes a protrusion and the other of the first and second movable contacts includes a groove in which the protrusion is inserted when the first and second movable contacts are connected with each other.

10. The gas insulated switchgear of claim 1, wherein the first fixed conductor includes a first cavity therein and a first mouth having a width smaller than a diameter of the first cavity,
    wherein the first movable contact includes a first flange extended from the second end of the first movable contact and inserted in the first cavity, wherein the first flange is larger than the first mouth.

11. The gas insulated switchgear of claim 1, wherein the second fixed conductor includes a second cavity therein and a second mouth having a width smaller than a diameter of the second cavity, wherein the second movable contact includes a second flange extended from the second end of the second movable contact and inserted in the second cavity, wherein the second flange is larger than the second mouth.

\* \* \* \* \*